(12) United States Patent  
Poltorak

(10) Patent No.: US 7,802,755 B2  
(45) Date of Patent: Sep. 28, 2010

(54) ROTATING WING AIRCRAFT WITH TIP-DRIVEN ROTOR AND ROTOR GUIDE-RING

(76) Inventor: Alexander I. Poltorak, 128 W. Maple Ave., Monsey, NY (US) 10952

( * ) Notice: Subject to any disclaimer, the term of this patent is extended or adjusted under 35 U.S.C. 154(b) by 1507 days.

(21) Appl. No.: 11/051,577

(22) Filed: Feb. 3, 2005

(65) Prior Publication Data

US 2006/0060693 A1 Mar. 23, 2006

Related U.S. Application Data

(60) Provisional application No. 60/552,092, filed on Mar. 10, 2004.

(51) Int. Cl.
*B64C 27/00* (2006.01)
(52) U.S. Cl. ............... 244/17.27; 244/17.25; 244/12.2; 244/23 C
(58) Field of Classification Search ............ 244/17.27, 244/6, 7 A, 17.11, 17.23, 17.25, 12.2, 23 C
See application file for complete search history.

(56) References Cited

U.S. PATENT DOCUMENTS

| 2,690,809 | A | 10/1954 | Kerry |
| 2,807,428 | A | 9/1957 | Wibault |
| 2,831,543 | A | 4/1958 | Matthews |
| 3,082,977 | A | 3/1963 | Arlin |
| 3,437,290 | A | 4/1969 | Norman |
| 3,677,503 | A | 7/1972 | Freeman, Jr. |
| 4,063,135 | A | 12/1977 | Wanlass |
| 4,081,724 | A | 3/1978 | Jarret et al. |
| 4,081,726 | A | 3/1978 | Brimer et al. |
| 4,114,060 | A | 9/1978 | McLean et al. |
| 4,194,178 | A | 3/1980 | Dumbeck |
| 4,281,263 | A | 7/1981 | Virolleau et al. |
| 4,291,248 | A | 9/1981 | Rainbolt |
| 4,467,231 | A | 8/1984 | Biglino |
| 4,469,294 | A | 9/1984 | Clifton |
| 4,503,346 | A | 3/1985 | Bertram et al. |
| 4,506,849 | A | 3/1985 | Lemont |
| 4,709,883 | A | 12/1987 | Giuliani et al. |
| 4,774,448 | A | 9/1988 | Yoshitomi |
| 4,807,830 | A | 2/1989 | Horton |
| 4,928,051 | A | 5/1990 | Demeter et al. |
| 5,013,990 | A | 5/1991 | Weber |
| 5,052,309 | A | 10/1991 | Haselwander et al. |
| 5,117,138 | A | 5/1992 | Trian |

(Continued)

FOREIGN PATENT DOCUMENTS

EP 1502852 * 2/2005

*Primary Examiner*—J. Woodrow Eldred
(74) *Attorney, Agent, or Firm*—Karl F. Milde, Jr.; William H. Dippert; Eckert Seamans

(57) ABSTRACT

A helicopter includes a main rotor guided and protected in minor impacts by a guide-ring. In selected embodiments, the rotor is powered by an electric motor employing a magnetic field generator carried by the main rotor and stator coils installed on the guide-ring. The helicopter's main rotor thus effectively functions as the rotor of the electric power plant of the helicopter. In selected embodiments, the rotor's blades are arranged so as to create an opening in the center of the rotor, allowing pilot ejection or deployment of a parachute capable of safely lowering the helicopter in case of an emergency.

1 Claim, 16 Drawing Sheets

U.S. PATENT DOCUMENTS

| | | | |
|---|---|---|---|
| 5,146,566 A | 9/1992 | Hollis, Jr. et al. | |
| 5,170,715 A | 12/1992 | Gran et al. | |
| 5,215,015 A | 6/1993 | Iida et al. | |
| 5,249,529 A | 10/1993 | Herbermann | |
| 5,320,305 A | 6/1994 | Oatway et al. | |
| 5,388,527 A | 2/1995 | Thornton | |
| 5,430,009 A * | 7/1995 | Wang | 505/166 |
| 5,433,149 A | 7/1995 | Kuznetsov | |
| 5,445,347 A | 8/1995 | Ng | |
| 5,448,213 A | 9/1995 | Kalsi | |
| 5,479,145 A | 12/1995 | Kalsi | |
| 5,503,351 A | 4/1996 | Vass | |
| 5,548,167 A | 8/1996 | Belikov | |
| 5,560,589 A | 10/1996 | Gran et al. | |
| 5,602,430 A | 2/1997 | Kalsi et al. | |
| 5,668,090 A | 9/1997 | Kalsi | |
| 5,808,387 A | 9/1998 | Akachi et al. | |
| 5,862,028 A | 1/1999 | Kalsi | |
| 5,953,996 A | 9/1999 | Powell et al. | |
| 6,044,770 A | 4/2000 | Davey et al. | |
| 6,057,620 A | 5/2000 | Chen et al. | |
| 6,085,663 A | 7/2000 | Powell et al. | |
| 6,147,423 A | 11/2000 | Byrd | |
| 6,357,359 B1 | 3/2002 | Davey et al. | |
| 6,450,103 B2 | 9/2002 | Svensson | |
| 6,504,275 B2 | 1/2003 | Nondahl et al. | |
| 6,598,693 B2 | 7/2003 | Honda et al. | |
| 6,629,503 B2 | 10/2003 | Post | |
| 6,777,833 B1 | 8/2004 | Williams | |
| 6,800,973 B2 | 10/2004 | Futami et al. | |
| 6,816,052 B1 | 11/2004 | Ziegler | |
| 6,876,122 B2 * | 4/2005 | Hansen | 310/268 |
| 2002/0153449 A1 * | 10/2002 | Hatzistelios | 244/12.2 |
| 2005/0082421 A1 * | 4/2005 | Perlo et al. | 244/12.2 |
| 2005/0230518 A1 * | 10/2005 | Lamont | 244/7 A |

* cited by examiner under the United States Patent rules and without these to US 7,802,755 B2

ROTATING WING AIRCRAFT WITH TIP-DRIVEN ROTOR AND ROTOR GUIDE-RING

REFERENCE TO RELATED PATENT DOCUMENTS

This application is related to Disclosure Document Number 540675, entitled TIP-DRIVEN SHAFTLESS ROTATING WING AIRCRAFT WITH GUARD-RING, filed on 24 Oct. 2003. The Disclosure Document is hereby incorporated by reference in its entirety, including all figures and matter incorporated in the Disclosure Document. This application claims priority benefit of provisional U.S. Patent Application Ser. No. 60/552,092, entitled ROTATING WING AIRCRAFT WITH TIP-DRIVEN ROTOR AND ROTOR GUIDE-RING, filed 10 Mar. 2004, which application is hereby incorporated by reference in its entirety, including all figures, tables, claims, and matter incorporated therein.

FIELD OF THE INVENTION

The present invention relates generally to rotating wing aircraft, and, more particularly, to helicopters, gyroplanes and other flying apparatus with tip-driven rotors and guide-rings.

BACKGROUND

Helicopter is a highly complex aircraft. It is said that a helicopter is two thousand parts flying together in one formation. This complexity contributes to the cost of production and operation and to the danger inherent in operating a helicopter. One of the factors contributing to the complexity of the helicopter design is the necessity to connect numerous control mechanisms, such as variable pitch angle control, collective control, etc., to the rotor blades via a rotating shaft. This complexity is further exacerbated by the flexible connection of the rotor blades to the shaft to allow for varying pitch angle and blade articulation necessary to compensate for lift deferential in the advancing and retreating phases of the cycle of rotation. The flexibility considerations dictated by the design of helicopter control mechanisms must be combined with structural strength dictated by the fact that the helicopter fuselage is supported in the air by the rotating rotor blades flexibly attached to the rotating shaft. These divergent factors greatly contribute to the complexity of design and operation and to the cost of production of helicopters. It would be desirable to provide a shaftless rotating wing aircraft or a rotating wing aircraft with a simplified or stationary main rotor shaft.

Helicopters are both dangerous and fragile. When on the ground, rotating rotor blades, which typically extend far beyond the fuselage of the aircraft, are akin to giant swinging swords creating a dangerous zone in the vicinity of the aircraft. Helicopters often operate at low altitudes and near trees, power lines, antennae, buildings, and other structures. Rescue helicopters often operate near mountain cliffs, even at high altitude. For well known reasons of basic physics, the main rotor of a helicopter is relatively large, typically extending beyond the helicopter's body in most horizontal directions. Therefore, objects in the immediate vicinity of an operating helicopter present danger to the helicopter: if the main rotor strikes an object, the rotor is likely to disintegrate, and the helicopter will probably crash. It would be preferable to provide a way to safeguard the rotor, at least in low-impact contacts with external objects.

Another problem with rotary wing aircraft is that rotor tips generate rather violent eddies of air. This turbulence increases power drag on the engine and the resulting parasitic losses, decreasing aircraft efficiency. The problem is aggravated at higher rotation speeds, as well as at higher cruising speeds, because the losses increase at higher air speeds of the rotor tips. It would be beneficial to provide a rotor with reduced tendency to generate eddies at its tips.

Yet another problem inherent in typical helicopter designs, and particularly in military helicopter designs, is that pilot ejection is impracticable: ejecting in the vertical direction obviously does not work because the pilot would be killed by the rotor. Helicopter pilots, however, are subject to manifold dangers on the battlefield, possibly even more so than pilots of fixed-wing military aircraft. It would be desirable to provide helicopters with pilot ejection capability.

Still another problem of helicopter design is related to the fact that linear velocity of a point on the rotor blade is proportional to the radius of rotation of the point, increasing towards the tip of the blade. Therefore, more lift is generated at the tips of the blades than near the rotor shaft. This causes the rotor blades to bend up at the tips during rotation, causing the disk of rotation to curve and assume a concave shape. This creates aerodynamic inefficiencies. It would be desirable to keep the blades horizontal and maintain a relatively flat disk of rotation to improve aerodynamic efficiency. It would also be desirable to have blades wider at the tips and narrower at locations closer to the center of rotation, to generate more lift.

Unlike airplanes, helicopters often operate at low airspeeds. Low airspeeds make possible, at least theoretically, deployment of a parachute in case of mechanical failure or another emergency that would otherwise result in a freefall of the aircraft. A parachute could thus safely lower a disabled helicopter to the ground—if only the parachute could be deployed. But much like the problem of ejecting a pilot from a disabled helicopter, the rotor is in the way of the parachute. It would be advantageous to enable parachute deployment in a helicopter.

Similar problems are pertinent to gyroplanes. As used by the Federal Aviation Administration (FAA), the term "gyroplane" refers to an aircraft that gets lift from a freely turning rotary wing (rotor blades), and which derives its thrust from an engine-driven propeller. Historically, this type of aircraft has also been known as the autogiro and the gyrocopter.

A need thus exists for rotary wing aircraft with a simplified design of the rotor shaft, or with shaftless design. Additional need exists for rotary wing aircraft that provide some protection to the rotor during impacts with external objects. A further need exists for rotary wing aircraft with reduced power losses due to eddies generated by rotor tips. Still another need exists to maintain rotor blades relatively straight during rotation and to avoid rotor curling up at the tips. A still further need exist to have rotor-blades wider at the tips than at the center of rotation. Another need exists for rotary wing aircraft with pilot ejection capability. Yet another need exists for helicopters that can deploy a parachute in an emergency.

SUMMARY

The present invention is directed to apparatus and methods that satisfy one or more of these needs. One aspect of the invention herein disclosed is embodied in a rotary wing aircraft with a fuselage, one or more rotor guide-rings (also known as guideways, guide-rails, and guard-rings) attached to the fuselage with a plurality of telescoping supports, one or more main rotors rotatably disposed in the guide-rings and guided by the guide-rings, and an inductive electrical main power plant driving the one or more main rotors from rotor tips. Various embodiments of the rotary wing aircraft in accordance with the invention include helicopters, gyroplanes, vertical take-off and landing aircraft, aerial tactical vehicles, and personal air transportation devices. Various embodiments of the rotary wing aircraft in accordance with the invention further include features on the following partial list:

anti-torque tail rotor;
  anti-torque tail rotor suspended in a second guide-ring;
  tailless vector stealthy (TVS) propulsion;
  propellers, jet, and turbine engines for facilitating forward motion and directional control;
  transfer systems for transmitting power from one of the main rotors to the tail rotor or propeller;
  duct systems for guiding the air pushed down by one of the main rotors to a nozzle used to control yaw; and
  rotor center concentric guide-rings defining an opening used for ejecting the helicopter's pilot or for deploying a parachute capable of safely lowering the helicopter in an emergency.

BRIEF DESCIRPTION OF THE FIGURES

DETAILED DESCRIPTION

Figure 1:
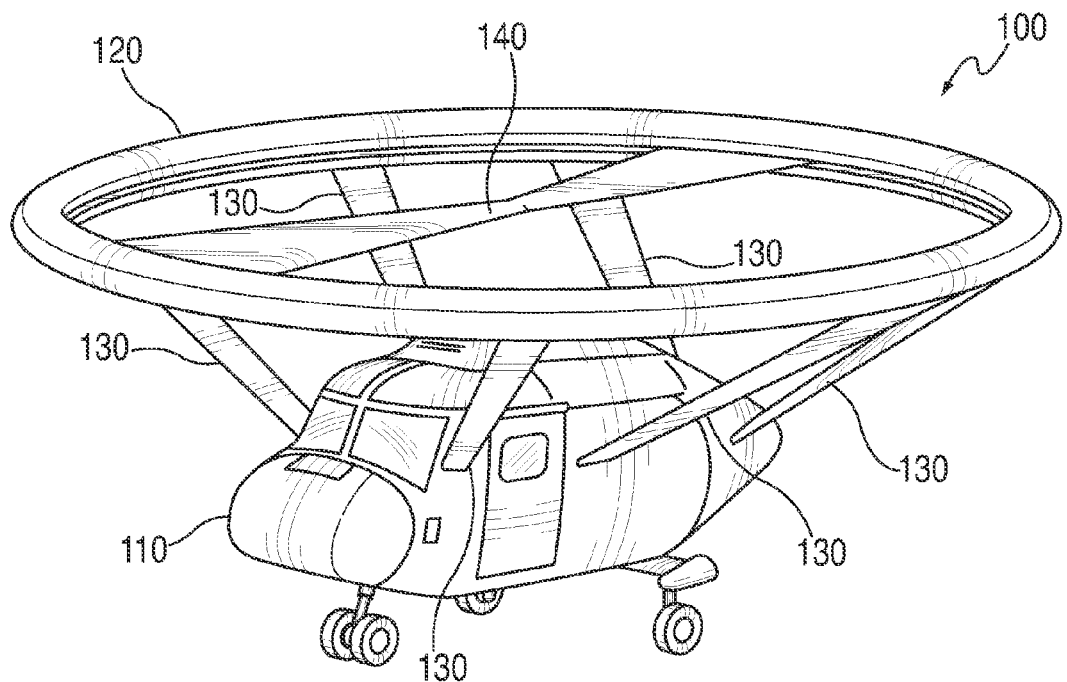
FIG. 1 illustrates a helicopter with a rotor guiding and protecting ring.

Reference will now be made in detail to several embodiments of the invention that are illustrated in the accompanying drawings. Wherever feasible and convenient, same or similar reference numerals are used in the drawings and the description to refer to the same or like parts. The drawings are in a simplified form and not to precise scale. For purposes of convenience and clarity only, directional terms, such as top, bottom, left, right, up, down, over, above, below, beneath, rear, and front may be used with respect to the accompanying drawings. These and similar directional terms should not be strictly construed to limit the scope of the invention. In addition, words such as couple, connect, and similar terms with their inflectional morphemes are used interchangeably, unless the difference is noted or made otherwise clear from the context. These words and expressions do not necessarily signify direct connections, but include connections through mediate components and devices.

FIG. 1 illustrates a helicopter 100 in accordance with the present invention. The helicopter 100 includes a fuselage 110 attached to a rotor guide-ring 120 with a plurality of supports 130. A main rotor 140 revolves within the ring 120, which both guides and protects the main rotor 140 in some impacts.

Figure 2:
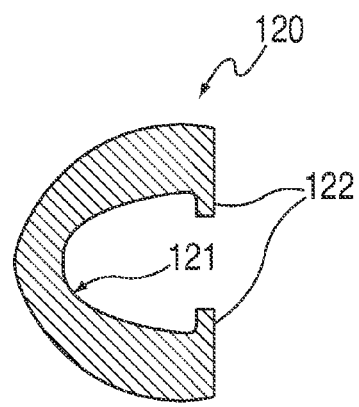
FIG. 2 illustrates a cross-section of the rotor guiding ring of the helicopter of FIG. 1.

FIG. 2 illustrates a cross-section of the ring 120 of the helicopter 100 of FIG. 1. It should be understood that different cross-sections are employed in alternative variants of the illustrated embodiment, and in other embodiments.

The lengths of the supports 130 determine the relative position of the ring 120 with respect to the fuselage 110. Because the plane of the ring 120 is substantially the same as the plane of the disk of rotation of the main rotor 140, the lengths of the supports 130 also determine the plane of the disk of the main rotor 140 and the axis of lift generated by rotation of the main rotor 140. As a person skilled in the art would know, the relationship between the axis of the lift and the fuselage 110 affects the attitude of the helicopter 100 providing forward thrust and directional control. To change the attitude, the relative lengths of the supports 130 are varied. In the illustrated embodiment, the supports 130 are hydraulically-activated telescopic supports, controlled by the helicopter pilot from the cabin located within the fuselage 110. In another embodiment, the pilot controls the lengths of the supports through electromechanical actuators. Other variable-length supports for the ring 120 can also be used for controlling the attitude of the helicopter.

The lift generated by the rotor 140 is transferred to the helicopter 100 through the tips of the rotor 140, the guide-ring 120, and the supports 130. To facilitate rotation of the rotor 140, its tips include rollers traveling on the inner surface 121 of the guide-ring 120 akin to a monorail. A sample inner surface 121 is illustrated in FIG. 2. Note also lips 122 formed on the inner surface 121; the lips 122 prevent the rollers and the tips of the rotor 140 from disengaging from the ring 120. In one alternative embodiment, the inner surface 121 and the tips of the rotor 140 are covered by a low-friction finish, such as polytetraflouroethylene, also known as PTFE or by trade name Teflon®.

In another alternative embodiment, the tips of rotor 140 are suspended between the lips 122 supported by the magnetic field (magnetic levitation or "maglev") using, for example, a form of linear induction motor.

Several approaches to magnetic levitation systems may be used in accordance with the present invention. Two of the approaches are briefly discussed herein. The first approach, called electromagnetic suspension (EMS), uses conventional electromagnets. It is employed by German Transrapid® magnetic levitation trains, and in Spanish-designed Maglift™ Monorail. The second approach, called electrodynamic suspension (EDS), is employed to levitate trains. In known applications, the approach uses the opposing forces between superconducting magnets on a train and electrically conductive strips or coils in a guideway to levitate the train. This approach is used in maglev trains in Miyazaki, Japan, developed by the Railway Technical Research.

Magnetic support of a rotating member is also illustrated and described in Horton, U.S. Pat. No. 4,807,830, which is hereby incorporated by reference in its entirety, including all figures, tables, and claims.

Persons skilled in the art may also find the following documents useful in understanding and designing magnetic levitation systems:

U.S. Pat. No. 6,816,052, entitled Track litz rungs and shorting bar design for urban maglev inductrack and method for making the same;

U.S. Pat. No. 6,777,833, entitled Magnetic levitation stage apparatus and method;

U.S. Pat. No. 6,629,503, entitled Inductrack configuration;

U.S. Pat. No. 6,450,103, entitled Monorail system;

U.S. Pat. No. 6,357,359, entitled Integrated high speed maglev system utilizing an active lift;

U.S. Pat. No. 6,085,663, entitled System and method for magnetic levitation guideway emplacement on conventional railroad line installations;

U.S. Pat. No. 6,057,620, entitled Geometrical structure configuration of maglev forces in a maglev rotational bearing apparatus;

U.S. Pat. No. 6,044,770, entitled Integrated high speed MAGLEV system;

U.S. Pat. No. 5,953,996, entitled System and method for magnetic levitation guideway emplacement on conventional railroad line installations;

U.S. Pat. No. 5,862,028, entitled Method and apparatus for detecting quenching of a coil for a superconducting magnet;

U.S. Pat. No. 5,668,090, entitled High-temperature AC superconducting magnets for a magnetic levitation system;

U.S. Pat. No. 5,602,430, entitled Superconducting electromagnet arrangement for a magnetic levitation system;

U.S. Pat. No. 5,560,589, entitled Active vibration damping arrangement for transportation vehicles;

U.S. Pat. No. 5,479,145, entitled Superconducting electromagnet for levitation and propulsion of a maglev vehicle;

U.S. Pat. No. 5,448,213, entitled Electromagnetic shielding concept for superconducting levitating magnets;

U.S. Pat. No. 5,445,347, entitled Automated wireless preventive maintenance monitoring system for magnetic levitation (MAGLEV) trains and other vehicles;

U.S. Pat. No. 5,433,149, entitled Composite reaction member for lateral guidance and levitation control of parellel electrically conductive and ferromagnetic strips;

U.S. Pat. No. 5,388,527, entitled Multiple magnet positioning apparatus for magnetic levitation vehicles;

U.S. Pat. No. 5,249,529, entitled Self-nulling hybred MAGLEV suspension;

U.S. Pat. No. 5,215,015, entitled Track system and vehicle having both magnetic and aerodynamic levitation, with wings on the vehicle carrying the whole weight at normal operating speeds;

U.S. Pat. No. 5,170,715, entitled Aeromagnetic control of maglev vehicles with turntable mounted hinged control surface having two degrees of motion;

U.S. Pat. No. 5,146,566, entitled Input/output system for computer user interface using magnetic levitation;

U.S. Pat. No. 5,052,309, entitled Track carrier for a high speed magnetic levitation transport system; and U.S. Pat. No. 4,709,883, entitled Launch and ascent system.

In various embodiments of rotary wing aircraft in accordance with the present invention, both EMS and EDS systems use a traveling magnetic wave along the circular guideway within the guide-ring 120 to propel the rotor 140 while the rotor is suspended between the lips 122 of the guide-ring 120.

The helicopter 100 is illustrated without an anti-torque tail rotor. Horizontal control of the helicopter 100 can be achieved by providing an air intake at the top of the fuselage 110 and an internal ducting system that channels the air pushed down by the main rotor 140 into a nozzle at the aft portion of the fuselage 110. In one variant of the embodiment 100, the air is directed to a fixed nozzle so as to counteract the torque exerted on the fuselage 110 by the motor that causes the main rotor 140 to rotate. In this variant, the helicopter's yaw is controlled by a valve regulating the volume of air that can exit through the nozzle. In another variant, the nozzle is movable, so that the direction of the exiting air can be controlled by pointing the nozzle through a control provided in the cabin.

Figure 3:
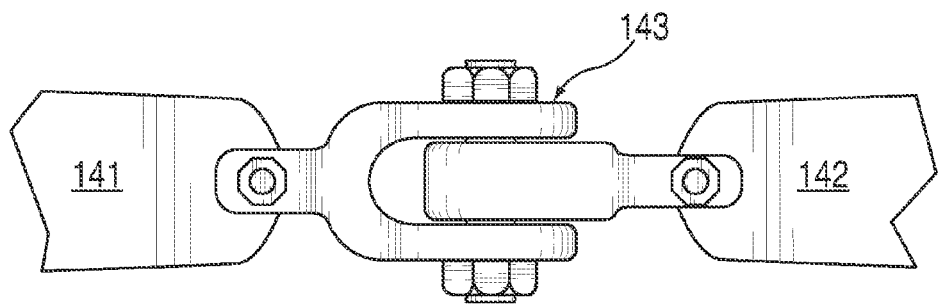
FIG. 3 illustrates top view of a rotor center portion of a helicopter in accordance with the present invention.
Figure 4:
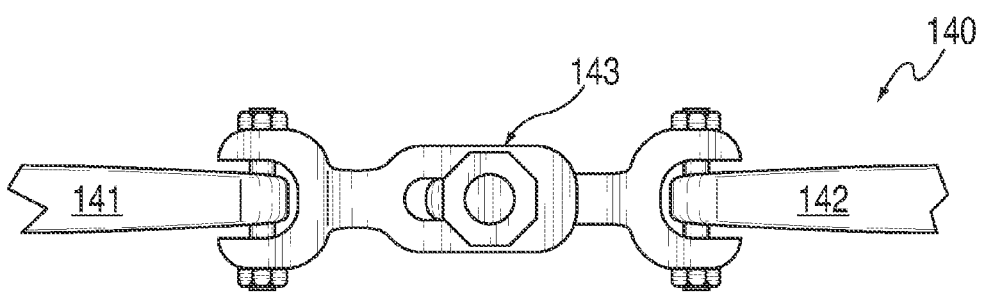
FIG. 4 illustrates side view of a rotor center portion of a helicopter in accordance with the present invention.

Top and side views of center portion of the main rotor 140 are illustrated in FIGS. 3 and 4, respectively. As can be seen in these Figures, blades 141 and 142 are flexibly coupled by a joint 143, in order to allow for articulation of the main rotor 140 during flight.

Figure 5:
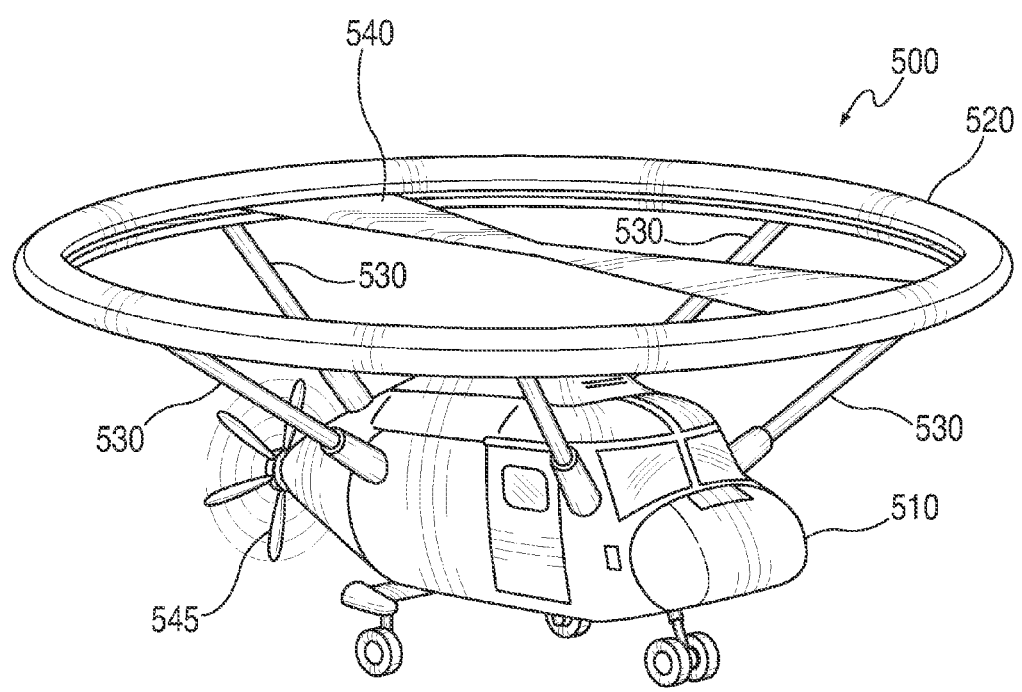
FIG. 5 illustrates a helicopter with a rear-mounted pusher propeller.

FIG. 5 illustrates a helicopter 500 in accordance with the present invention. The embodiment of FIG. 5 includes a fuselage 510, a guiding and protecting ring 520, telescoping supports 530, and a rotor 540; these components are similar or identical to corresponding and similarly-numbered components illustrated in FIG. 1. An additional aspect of the invention is a rear-mounted pusher propeller 545 that facilitates or causes forward propulsion of the helicopter 500. In some variants of this embodiment, the propeller 545 is powered by a separate power plant, for example, one or more electric motors, reciprocating internal combustion engines, or turbines. Propulsion of the helicopter 500 may be caused by the pusher propeller 545, by a horizontal component of the lift generated by the rotor 540, or by a combination of these propulsion sources. The pusher propeller 545 may also be used to counteract the torque of the rotor 540. In alternative embodiments, one or more jet engines cause forward propulsion of a helicopter.

Figure 6:
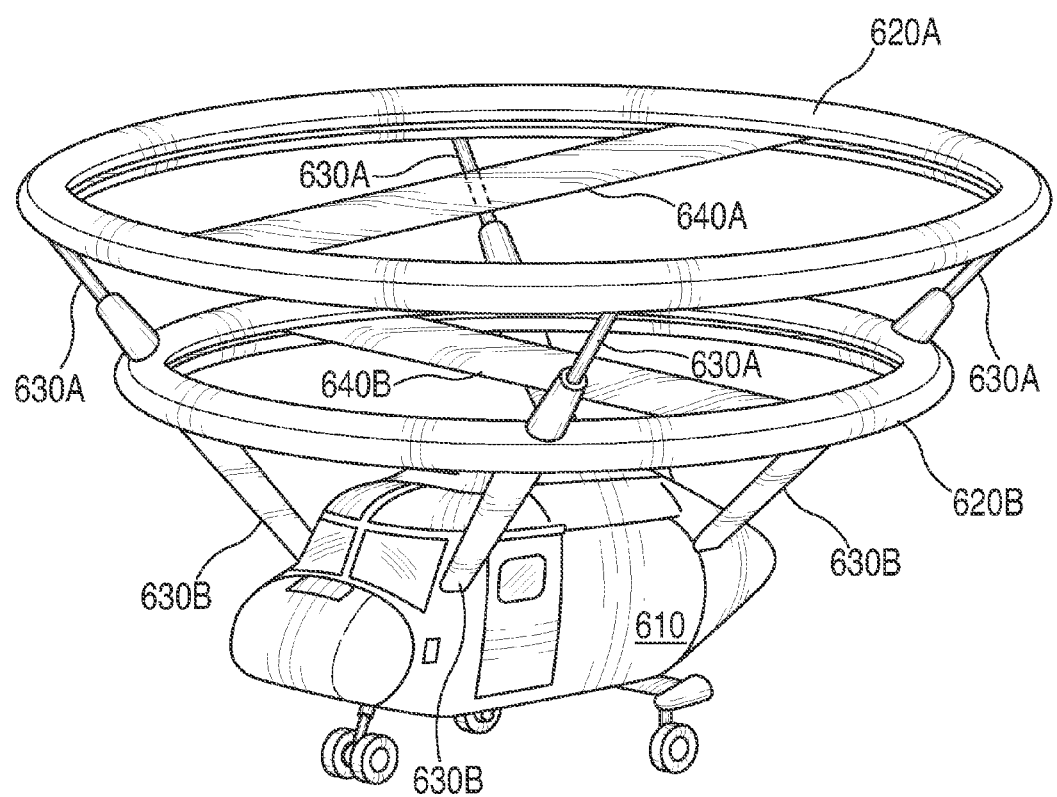
FIG. 6 illustrates a helicopter with twin coaxial counter-rotating rotors of varying diameter.

FIG. 6 illustrates another helicopter, 600, in accordance with the present invention. The helicopter 600 is also similar to the embodiment of FIG. 1, but includes dual guide-rings 620A and 620B that guide and protect twin, substantially coaxial rotors 640A and 640B. The guide-ring 620B is attached to a fuselage 610 by a set of guide-ring supports 630B; the guide-ring 620A is attached to the guide-ring 620B by a set of telescoping supports 630A. The rotors 640A and 640B are counter-rotating. They substantially cancel the torque, i.e., a tendency of the helicopter 600 to rotate about its vertical axis, and obviate the need for an anti-torque tail rotor or other means for countering torque-caused changes in yaw. As illustrated, diameter of the rotor 640A is slightly larger than the diameter of the rotor 640B. In some variants, the two coaxial rotors and the corresponding guide-rings have the same diameters. In other variants, the upper rotor is smaller than the lower rotor.

Figure 7:
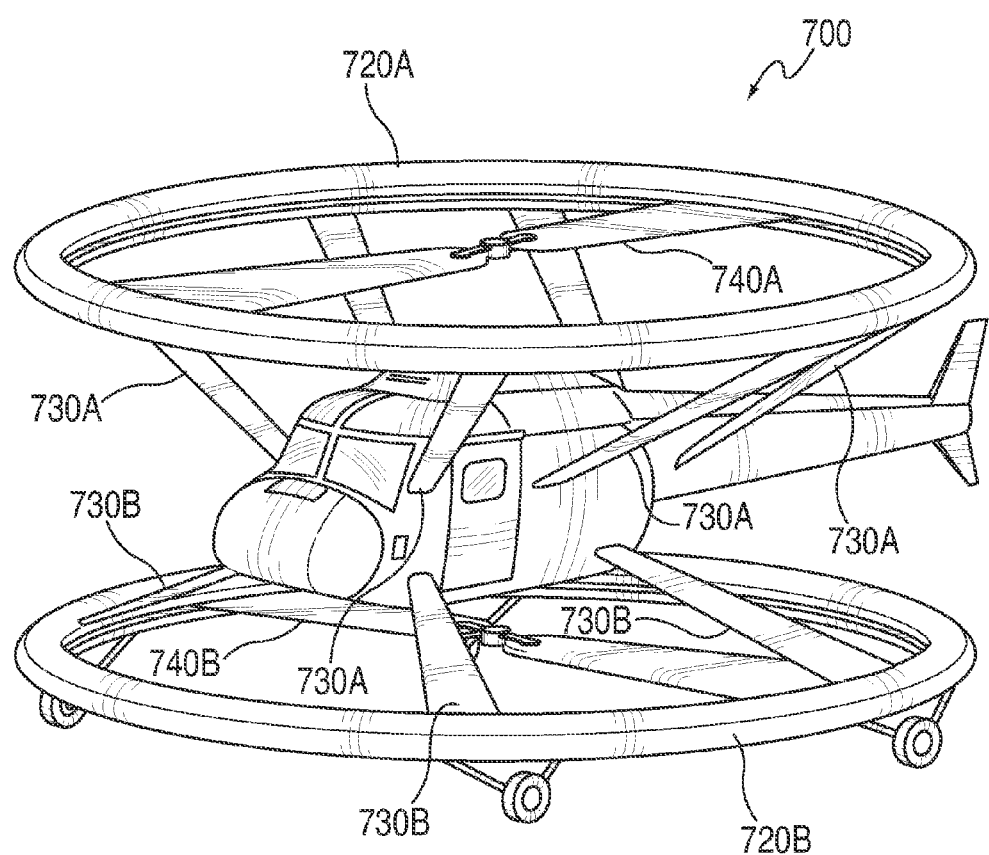
FIG. 7 illustrates a helicopter with an upper rotor disposed above the fuselage, and a lower counter-rotating rotor disposed below the fuselage.

Helicopter 700 illustrated in FIG. 7 is similar in concept to the helicopter 600, with two counter-rotating rotors 740A and 740B canceling the tendency of the helicopter to rotate about its vertical axis. In this embodiment, however, a lower guide-ring 720B, which guides and protects the rotor 740B, is disposed below a fuselage 710 and is attached to the fuselage 710 by a set of lower supports 730B. An upper guide-ring 720A is attached to the fuselage 710 by a set of upper supports 730A.

Figure 8:
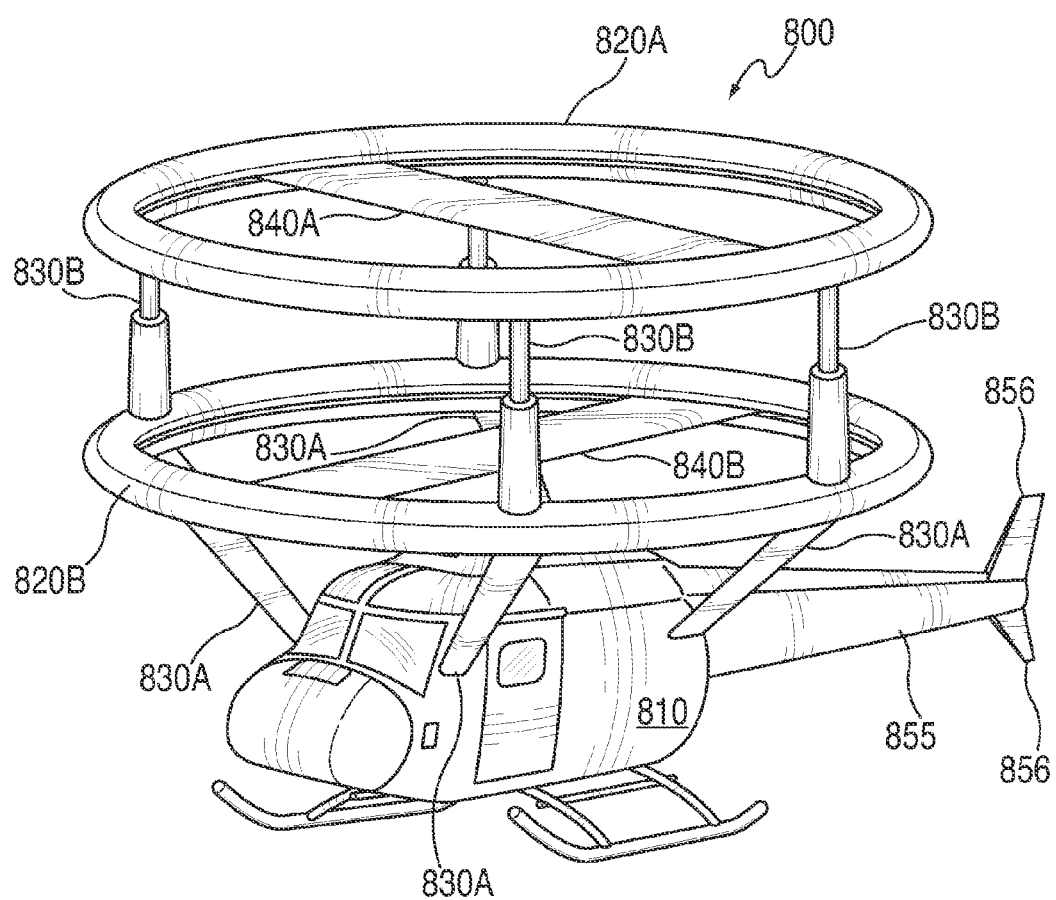
FIG. 8 illustrates a helicopter with twin coaxial counter-rotating rotors of substantially equal diameter.

FIG. 8 illustrates a helicopter 800 with twin, substantially coaxial rotors 840A and 840B. The twin rotors 840 have substantially equal diameters and are guided and protected by guide-rings 820A and 820B. Telescoping supports 830B attach the two guide-rings to each other. Guide-ring supports 830A locate the lower guide-ring 820B. In an alternative embodiment, the supports 830B are fixed, while the supports 830A are hydraulically telescoping. In this alternative embodiment, the supports 830A tilt the assembly formed by the rings 820, the rotors 840, and the supports 830B as a single unit. A tail boom 855 and a vertical stabilizer 856, which is disposed at the end of the tail boom 855, enhance horizontal stability of the helicopter 800.

Figure 9:
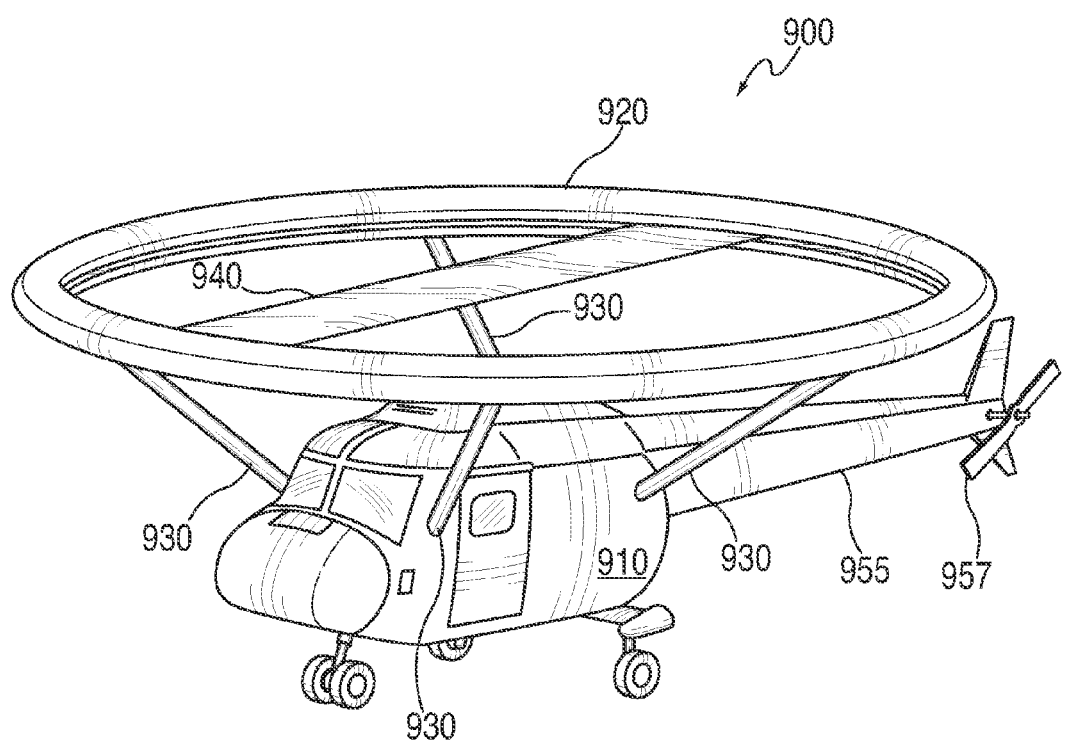
FIG. 9 illustrates a helicopter with yaw control provided by an anti-torque tail rotor.
Figure 16:
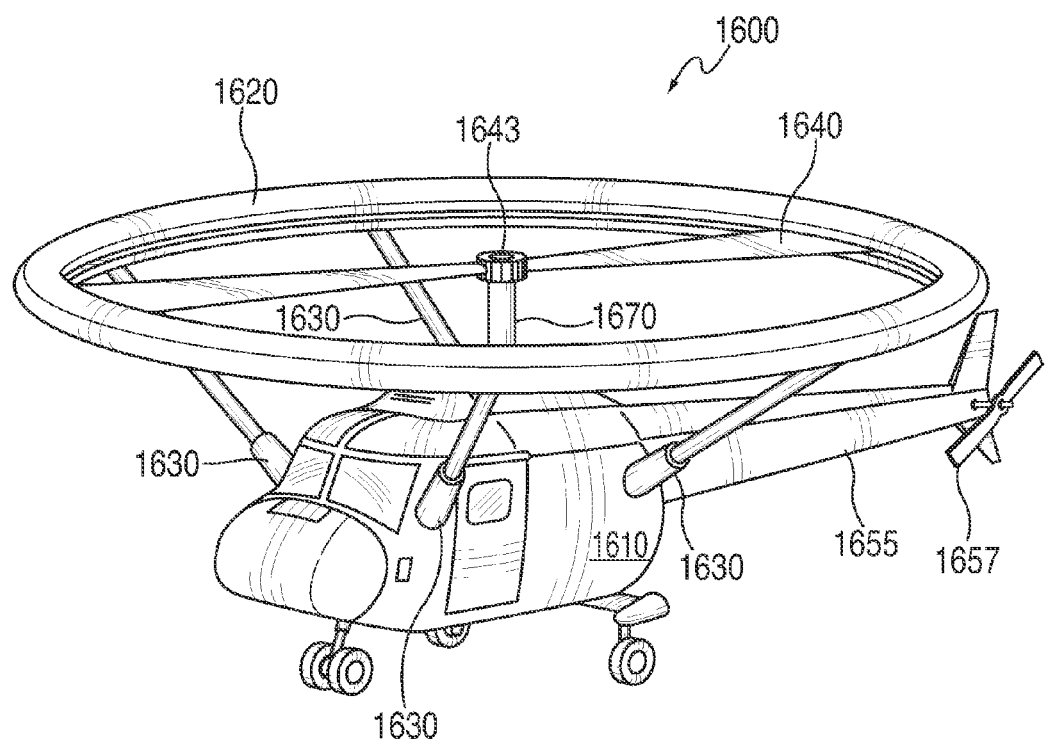
FIG. 16 illustrates a helicopter with a power transmission system that transfers power from the helicopter's main rotor to the tail rotor.

In the helicopters in accordance with the present invention horizontal (yaw) control can be realized through a conventional anti-torque tail rotor. FIG. 9 illustrates a helicopter 900 with a single main rotor 940 within a guide-ring 920, located by a set of supports 930. For yaw control, an anti-torque tail rotor 957 is disposed at the tail boom 955. In a variant of this embodiment, the tail rotor 957 is powered by a separate motor, for example, an electrical motor. In other variants of the tail-rotor design, the main power plant of the helicopter 900 also drives the tail rotor 957. One such variant is illustrated in FIG. 16, which is discussed further below. In some embodiment in accordance with the present invention, the tail rotor is also disposed in a guide-ring, similarly to the main rotor.

Figure 10:
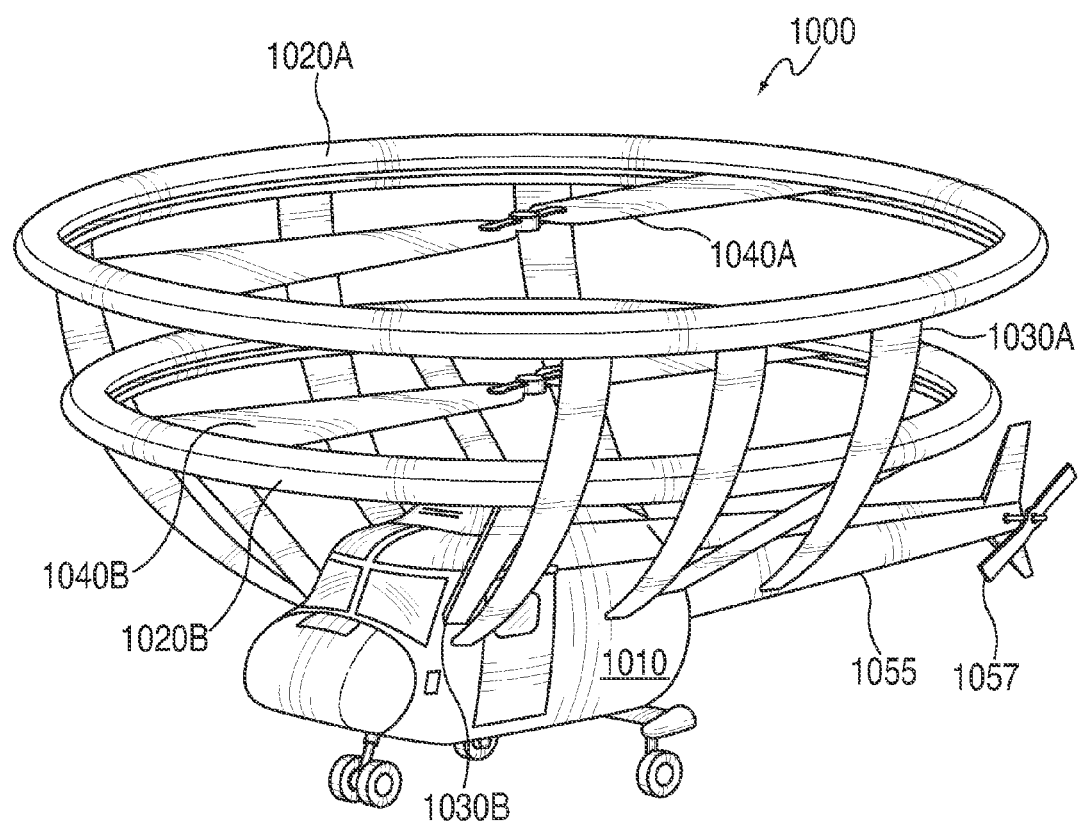
FIG. 10 illustrates a helicopter with twin coaxial rotors of varying diameters, rotor guiding rings located by separate sets of supports, and an anti-torque tail rotor.

FIG. 10 illustrates a helicopter 1000 with coaxial rings 1020A and 1020B that guide and protect substantially coaxial main rotors 1040A and 1040B. The helicopter 1000 also includes an auxiliary anti-torque tail rotor 1057, which allows the helicopter 1000 to operate with the main rotors 1040 rotating in either the same direction or in opposite directions. In this embodiment, the rings 1040A and 1040B are attached to a fuselage 1010 by separate sets of supports 1030A and 1030B, respectively.

Figure 11A:
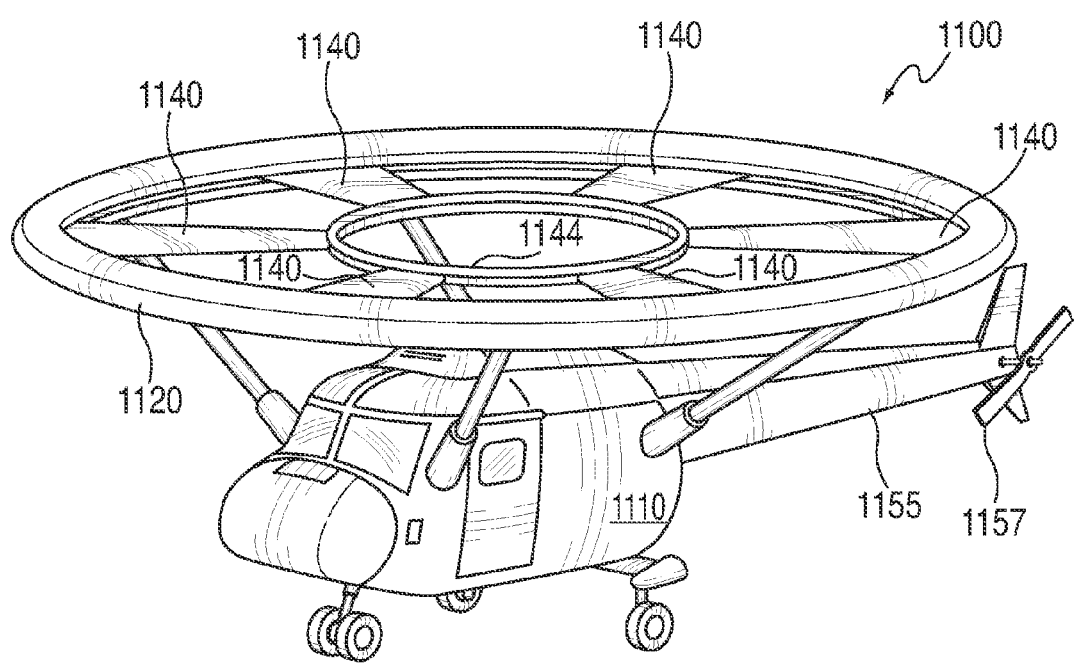
FIG. 11A illustrates a helicopter with a rotor having six blades and a center ring defining an opening through which a pilot can be ejected or a parachute deployed in an emergency.
Figure 11B:
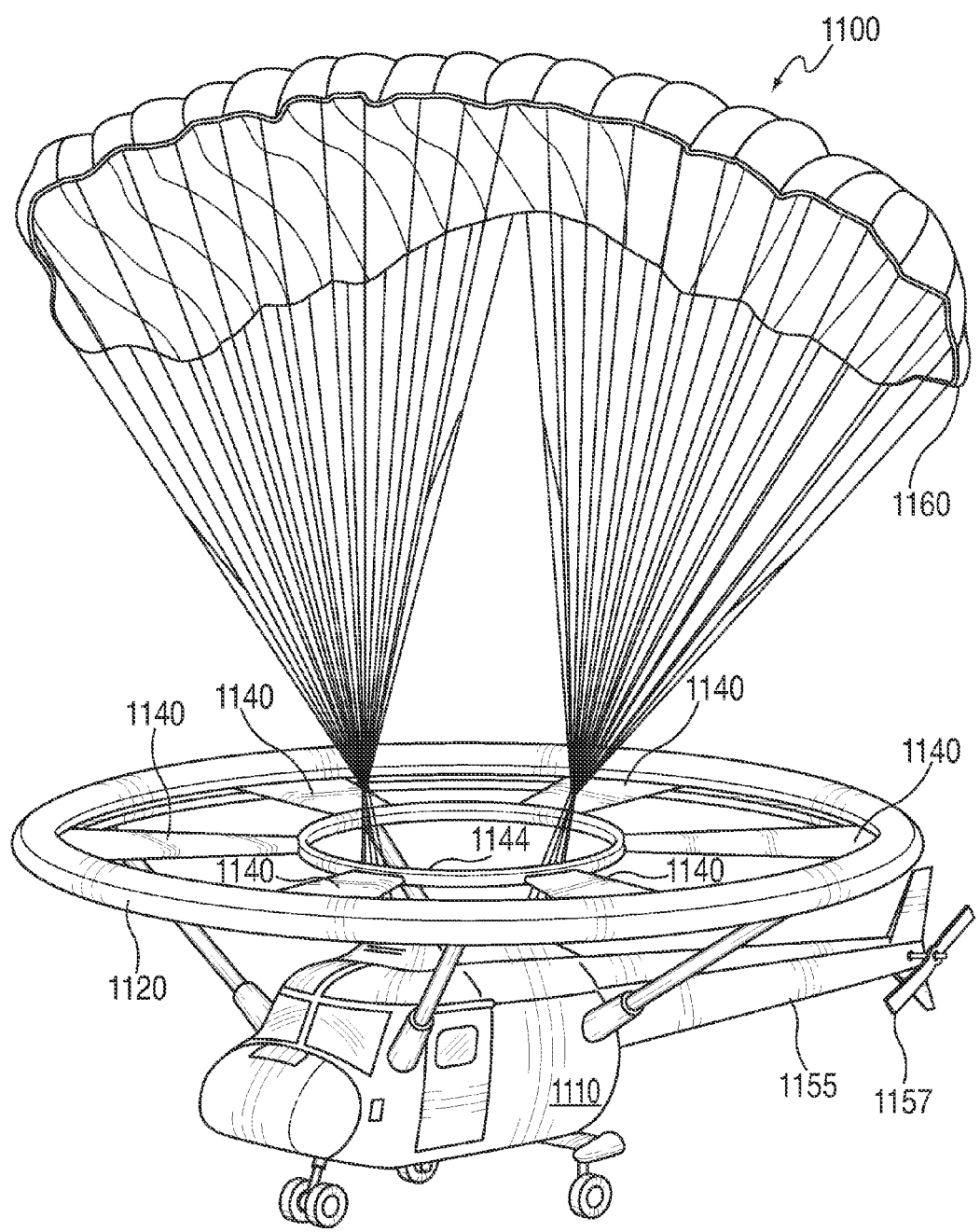
FIG. 11B illustrates the helicopter of FIG. 11A with a deployed parachute.

Rotor design need not be limited to any particular number of blades, such as two-blade designs illustrated up to this point. Moreover, rotor blades need not pass through the center of the guide-ring within which the rotor rotates. FIG. 11A illustrates a helicopter 1100 with a rotor 1140 that includes six blades attached to a center ring 1144. Otherwise similar to the helicopter 900 of FIG. 9, the helicopter 1100 is capable of receiving pilot ejection equipment or a parachute that can safely lower the helicopter 1100 in case of emergency. Both the ejection equipment and the parachute can be deployed through the opening created by the center ring 1144 of the rotor 1140. FIG. 11B illustrates the helicopter 1100 with a deployed parachute 1160.

Figure 12:
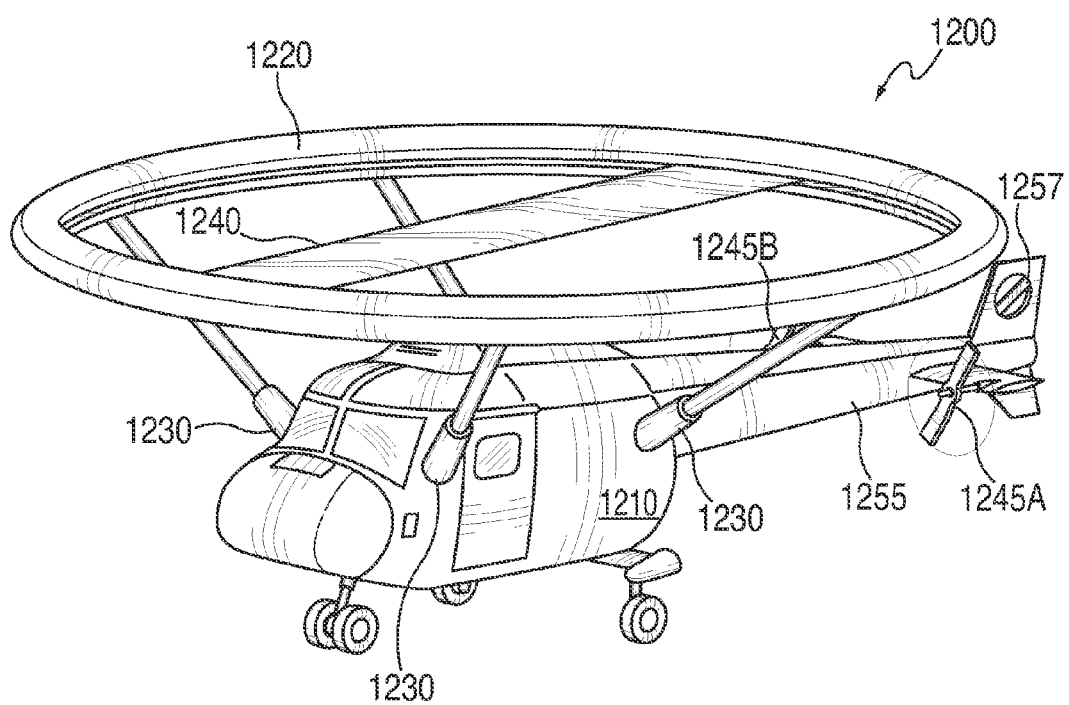
FIG. 12 illustrates a helicopter with an anti-torque rotor and dual propulsion propellers in addition to a main rotor.

An aircraft in accordance with the present invention may include both an anti-torque rotor and a rotor/propeller used for propulsion. One such aircraft is illustrated in FIG. 12, which shows a helicopter 1200 with an anti-torque tail rotor 1257 and dual propellers 1245A and 1245B used for propulsion.

Figure 13:
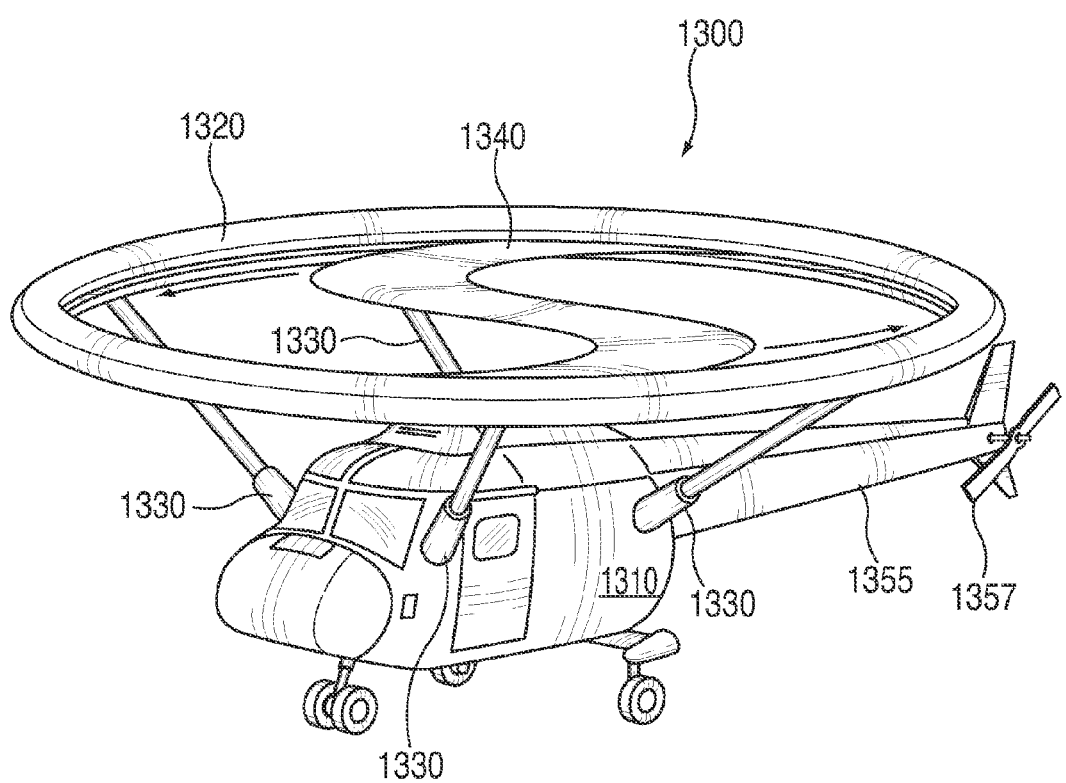
FIG. 13 illustrates a helicopter a helicopter with an S-shaped rotor within a guide-ring.

Various shapes of the main rotor also fall within the scope of the invention. FIG. 13 illustrates a helicopter 1300 with an S-shaped rotor 1340 within a guide-ring 1320 attached to a fuselage 1310 by four telescoping supports 1330.

Power to the main rotor of a helicopter in accordance with the present invention can be provided in several ways. In certain embodiments, a helicopter's main rotor is powered by an electric motor. For example, the main rotor can also act as a rotor of an electric motor, while the guide-ring acts as a stator of the electric motor. Many different electric motors are known in the art. Some aspects of electrical motors are described below.

Figure 14:
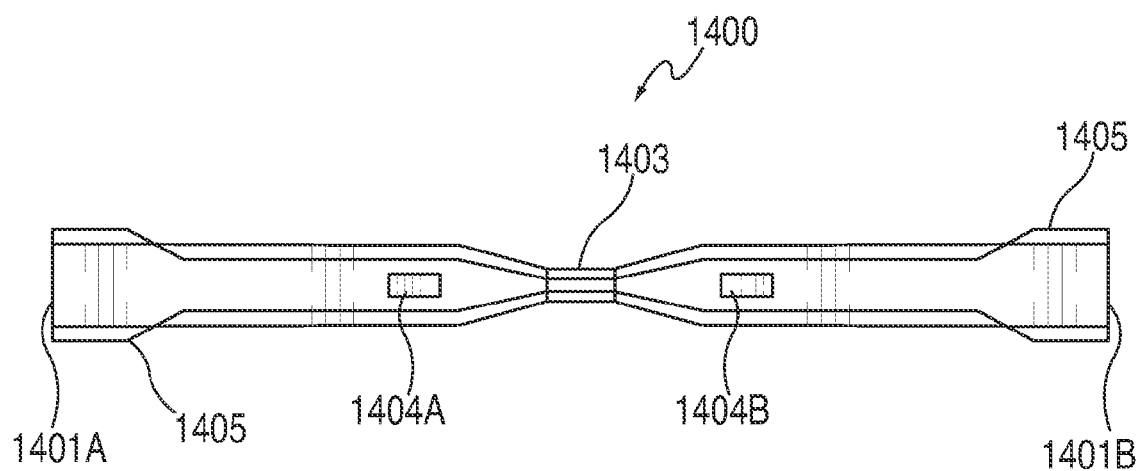
FIG. 14 is a side view of a helicopter rotor that acts as a rotor of an electric power plant of the helicopter.

FIG. 14 is a greatly simplified illustration of a side view of a rotor 1400 that acts as both a helicopter's main rotor and a rotor of a synchronous alternating current (AC) electric motor. The rotor 1400 includes two blades, 1401A and 1401B coupled to each other at the center of the rotor 1400. Inside the blades 1401 reside small direct current (DC) sources of electric energy 1404A and 1404B for energizing windings 1405 and creating the field circuit used in the operation of the electric motor. As illustrated, the windings 1405 are partially embedded inside the blades 1401 and pass through the coupling 1403. Alternatively, the windings 1405 can be either completely embedded inside the blades 1401, or be substantially outside the blades 1401 and the flexible joint 1403. In still other embodiments, the rotor 1400 carries permanent magnets on its blades 1401 to create the DC field used in the operation of the electric motor that is the main power plant of the helicopter.

Figure 15:
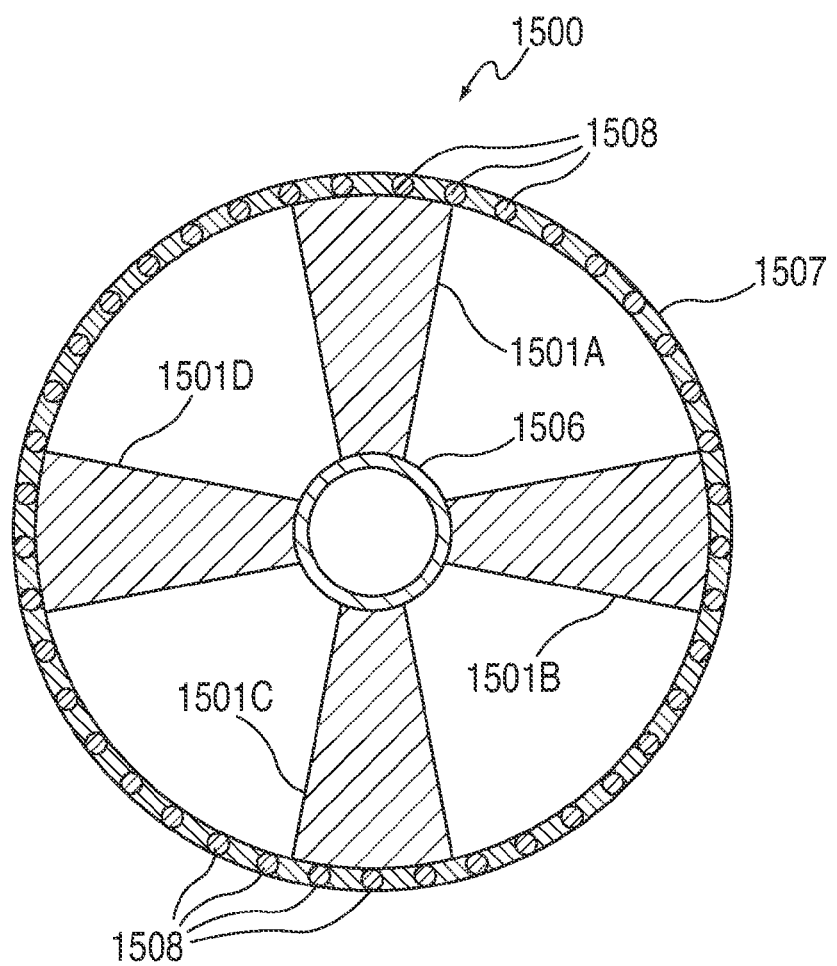
FIG. 15 is a top view of a four-blade helicopter rotor that simultaneously acts as a rotor of a squirrel-cage induction electric power plant of the helicopter.

In another embodiment, the electric motor is a squirrel-cage induction motor. Top view of a four-blade rotor 1500 of this embodiment is illustrated in FIG. 15. Each of the rotor blades, designated by reference characters 1501A-D, is located by a center ring 1506 and an outer ring 1507. Rotor windings are not needed in this embodiment, because the rotor's field is induced in embedded conductors 1508, which move in the field generated by the stator coil of the electric motor. Note that only cross-sections of the embedded conductors 1508 appear in FIG. 15, because the conductors 1508 are disposed substantially perpendicularly to the plane in which the rotor 1500 rotates.

The stator of the electric motor—be it an AC, DC, synchronous, induction, single phase, multiphase, or another kind of electric motor—may be included in the guiding and protecting ring surrounding the rotor. In one embodiment, several coils are built into the ring, with stator windings being disposed substantially perpendicularly to the plane in which the rotor rotates. The power to the stator windings is provided by a main energy source on board the helicopter, through the telescopic supports that hold the stator/guide-ring. In particular helicopter embodiments in accordance with the invention, the electric energy for the helicopter power plant is provided from batteries, fuel cells, solar cells, primary cells, secondary cells, capacitors or any combination thereof. When the power plant is AC-powered, the helicopter may include a DC-to-AC converter in order to adapt the DC power stored in a cell to the power plant requirements.

In some embodiments, electromagnets are disposed circumferentially in the guide-ring and a linear induction motor is formed by the main rotor and the guide-ring. The main rotor is magnetically levitating in the guide-ring supported by electromagnetic suspension forces generated by the electromagnets. A traveling magnetic wave generated by the linear induction motor and the electromagnets propels (rotates) the rotor inside the guide-ring, producing lift.

In some embodiments, electrically conductive strips or electromagnetic coils are disposed in the guide-ring, and superconducting magnets are disposed at the tips of the rotor. A linear induction motor is formed by the main rotor and the guide-ring. The main rotor is magnetically levitating in the guide-ring supported by electrodynamic suspension generated by opposing forces between the superconducting magnets and the electrically conductive strips (or coils). A traveling magnetic wave generated by the linear induction motor propels (rotates) the rotor inside the guide-ring, producing lift.

Persons skilled in the art may find the following documents useful in understanding and designing electric motors:

U.S. Pat. No. 6,800,973, entitled Stator winding connection arrangement for electric motor;

U.S. Pat. No. 6,598,693, entitled Electric motor-driven vehicle;

U.S. Pat. No. 6,504,275, entitled Electric motor having rotor-embedded sensor;

U.S. Pat. No. 6,147,423, entitled Electric motor having improved rotor assembly, and method by which the rotor assembly is made;

U.S. Pat. No. 5,808,387, entitled Electric motor for an electric vehicle;

U.S. Pat. No. 5,548,167, entitled Inductive linear electric motor;

U.S. Pat. No. 5,117,138, entitled Stator for an electric motor and motor equipped therewith;

U.S. Pat. No. 5,013,990, entitled Energy conserving electric motor power control method and apparatus;

U.S. Pat. No. 4,928,051, entitled Electric motor;

U.S. Pat. No. 4,774,448, entitled Reversible variable-speed 2-phase electric motor;

U.S. Pat. No. 4,503,346, Electric motor having a stator iron of a bent shape;

U.S. Pat. No. 4,467,231, entitled Permanent-magnet d.c. electric motor with resilient stator yoke U.S. Pat. No. 4,291,248, entitled Electric motor;

U.S. Pat. No. 4,281,263, entitled Hybrid stator and a two-axis induction electric motor constructed therewith;

U.S. Pat. No. 4,194,178, entitled Electric motor with internal wireless load monitor;

U.S. Pat. No. 4,114,060, entitled Electric motor;

U.S. Pat. No. 4,081,726, entitled Electric motor;

U.S. Pat. No. 4,081,724, entitled Variable reluctance electric motor; and

U.S. Pat. No. 4,063,135, entitled Electric motor having controlled magnetic flux density.

All of the above-listed patent documents are hereby incorporated by reference in their entireties, including all figures, tables, and claims.

Additional guidance regarding electric motors may be found in Irving M. Gottlieb, Practical Electric Motor Handbook (Buttrerworth-Heinemann 1997) (ISBN 0 7506 3638 2), which book is incorporated by reference in its entirety, including all figures and tables.

As described in this document, a main rotor of a helicopter can be driven from the rotor's perimeter or blade tips, such as in the cases of the electric-powered rotors of FIGS. 14, and 15. (By driven from the rotor's perimeter or driven from the rotor's tips I mean that the power/torque is delivered to the rotor not from the center of the rotor by a central shaft connected to a motor, but from point or points closer to the tips of the rotor's blades.) If the helicopter is equipped with an anti-torque tail rotor or a propeller used for forward motion, the tail rotor or the propeller may be powered by a second, independent power plant, as has already been discussed. Alternatively, the tail rotor or propeller may be powered by the main power plant, for example, through a power transmission system of shafts and gears that transfers the power from the main rotor to the tail rotor or propeller. FIG. 16 illustrates a helicopter 1600 using one such arrangement.

The helicopter 1600 is similar to the helicopter 900 illustrated in FIG. 9. Here, however, a power-tapping shaft 1670 forms part of the system for transferring power to a tail rotor 1657. A main rotor 1640 and a guide-ring 1620 form, respectively, rotor and stator of an electric power plant of the helicopter 1600. The shaft 1670 connects to a joint 1643 at the center of the rotor 1640. When the rotor 1640 turns under influence of the electromagnetic forces generated between the stator/guide-ring 1620 and windings or permanent magnets of the rotor 1640, the shaft 1670 turns together with it. At its lower end, the shaft 1670 is attached to a transverse gear set that changes the direction of the power flow, directing the power flow towards the rear of the helicopter 1600. In some variants of the embodiment illustrated in FIG. 16, the gear set also changes the rotational velocity of its output shaft, scaling the rotational velocity of the main rotor to the rotational velocity requirements of the tail rotor.

Figure 17:
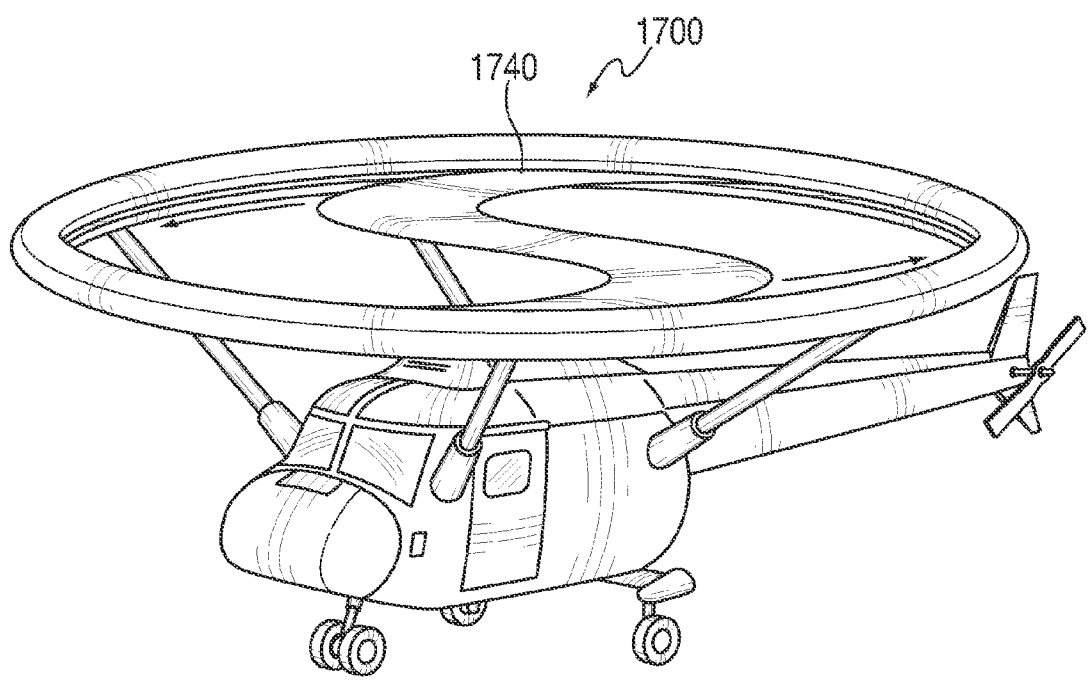
FIG. 17 illustrates a helicopter with an S-shaped rotor.

So far, main rotor blades have been illustrated as relatively straight elements. This need not always be the case. FIG. 17 illustrates this point by showing a helicopter 1700 with an S-shaped main rotor.

Figure 18:
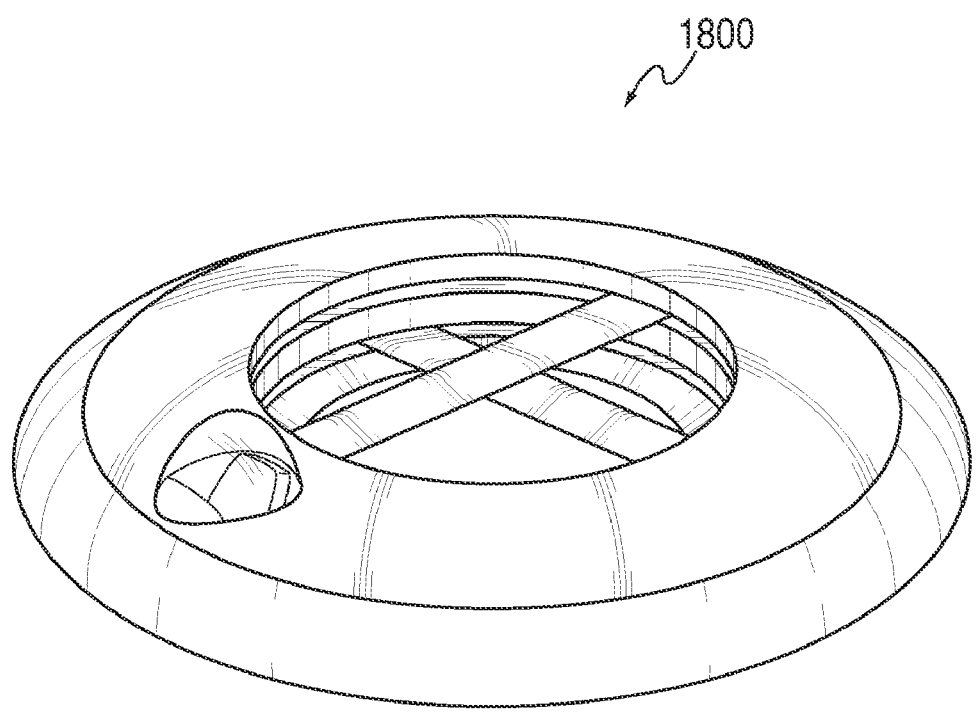
FIG. 18 illustrates a helicopter with a guide-ring integrated with the helicopter's fuselage.

The guide-rings need not be structurally separate from the helicopter fuselage. In some embodiments, one or more guide-rings are integral with the fuselage. For example, a fuselage may have a cylindrical duct, with a rotor guide-ring situated on a cross-section of the duct. A helicopter 1800 with this arrangement is illustrated in FIG. 18.

This document describes in some detail the inventive rotary wing aircraft and methods for powering them. This was done for illustration purposes only. Neither the specific embodiments of the invention as a whole, nor those of its features limit the general principles underlying the invention. In particular, the invention is not necessarily limited to specific arrangements of rotors, to the number of the rotors employed, to particular power plants, or to the use or non-use of anti-torque tail rotors, propellers, or flexible rotor joints. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not necessarily define the metes and bounds of the invention and the legal protections afforded the invention.

I claim:

1. A helicopter comprising:
  a. a fuselage;
  b. a first rotor guide-ring;
  c. a plurality of first supports attaching the first rotor guide-ring to the fuselage;
  d. a first main rotor being rotatably carried by the first guide-ring; and
  e. an electric motor capable of rotating the first main rotor, wherein the first guide-ring comprises a circular monorail, and the first main rotor comprises rollers movably disposed on said monorail.

* * * * *